(12) United States Patent
Koifman

(10) Patent No.: US 7,791,664 B1
(45) Date of Patent: Sep. 7, 2010

(54) METHODS FOR READING A PIXEL AND FOR WRITING TO A PIXEL AND A DEVICE HAVING PIXEL READING CAPABILITIES AND PIXEL WRITING CAPABILITIES

(75) Inventor: Vladimir Koifman, Rishon Lezion (IL)

(73) Assignee: Advasense Technologies Ltd.

( * ) Notice: Subject to any disclaimer, the term of this patent is extended or adjusted under 35 U.S.C. 154(b) by 497 days.

(21) Appl. No.: 11/752,973

(22) Filed: May 24, 2007

Related U.S. Application Data

(60) Provisional application No. 60/807,848, filed on Jul. 20, 2006.

(51) Int. Cl.
*H04N 3/14* (2006.01)
*H04N 5/335* (2006.01)
*H01L 27/00* (2006.01)
*H01L 27/14* (2006.01)

(52) U.S. Cl. .................. 348/308; 250/208.1; 257/431
(58) Field of Classification Search .............. 348/308; 250/208.1; 257/431–466
See application file for complete search history.

(56) References Cited

U.S. PATENT DOCUMENTS

| 6,346,696 | B1* | 2/2002 | Kwon ................ 250/208.1 |
| 2004/0201761 | A1* | 10/2004 | Mentzer ................ 348/308 |
| 2006/0049334 | A1* | 3/2006 | Henderson et al. ....... 250/208.1 |
| 2007/0023786 | A1* | 2/2007 | Johnson et al. ........... 257/222 |

\* cited by examiner

*Primary Examiner*—Sinh Tran
*Assistant Examiner*—Christopher K Peterson
(74) *Attorney, Agent, or Firm*—Reches Patents

(57) ABSTRACT

Methods for reading a pixel and writing to a pixel and devices having pixel reading capabilities and pixel writing capabilities. A method for reading a pixel includes: activating a second transistor that is coupled to a second node while maintaining an input transistor inactive; wherein the first transistor is coupled between the second node and a photo-detector; inactivating the second transistor; compensating for second node voltage change resulting from the inactivating of the second transistor by providing a feedback signal via at least one capacitance that capacitively couples the pixel node to the second node; and activating the input transistor and measuring a pixel output signal.

34 Claims, 15 Drawing Sheets

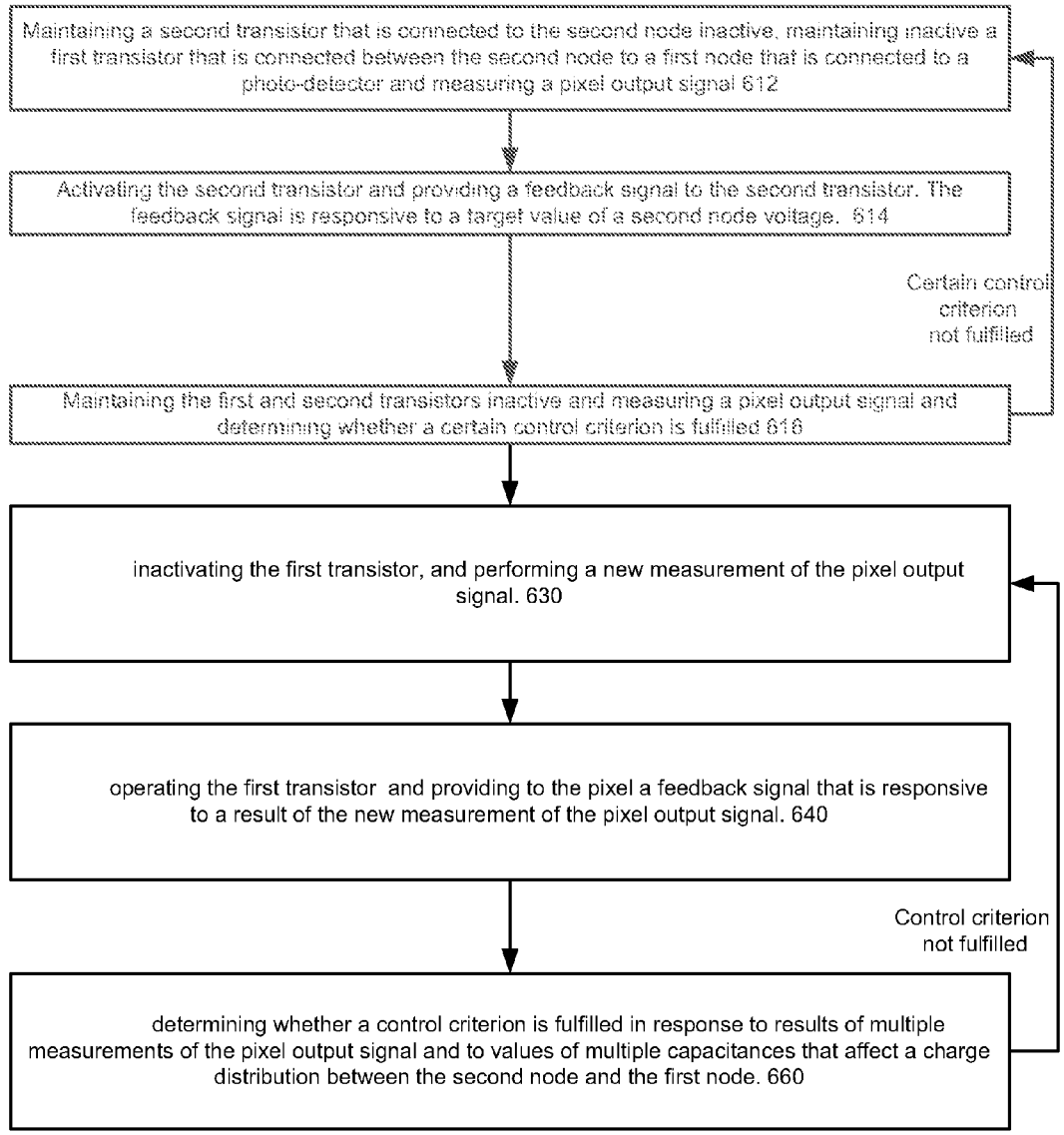
600' Figure 14

METHODS FOR READING A PIXEL AND FOR WRITING TO A PIXEL AND A DEVICE HAVING PIXEL READING CAPABILITIES AND PIXEL WRITING CAPABILITIES

RELATED APPLICATIONS

This application claims priority of U.S. provisional patent Ser. No. 60/807,848 filing date Jul. 20, 2006.

FIELD OF THE INVENTION

The invention relates to methods for reading a pixel and for writing to a pixel and to devices having pixel reading capabilities and/or pixel writing capabilities.

BACKGROUND OF THE INVENTION

Digital cameras include a two-dimensional photo-detector array. A single pixel can include one or more photo-detectors as well as multiple transistors. Typical photo-detectors include photodiodes, phototransistors, photo-gates, hole accumulation diodes, pinned diodes, avalanche diodes, buried accumulation and transfer layer devices.

The performance of CMOS pixels is limited by their thermal noise. This noise is also known as reset noise of KTC noise. During a reset phase of the pixel a reset voltage is provided to the pixel and especially to a reset transistor of the pixel. When this reset phase ends the reset transistor enters a non-conductive stage and thermal noise is generated.

Various prior art pixels are known. The most commonly used pixels are either CCD pixels or CMOS pixels. Prior art CMOS pixels and two dimensional CMOS arrays are illustrated in the following U.S. patents which are incorporated herein by reference: U.S. Pat. No. 6,777,660 of Lee, titled "CMOS active pixel reset noise reduction"; U.S. Pat. No. 6,762,401 of Lee, titled "CMOS image sensor capable of increasing fill factor and driving method thereof"; U.S. Pat. No. 6,567,495 of Harada titled "solid-state imaging device and a method of reading a signal charge in a solid-state imaging device which can reduce smear and can provide an excellent image characteristics"; U.S. Pat. No. 6,750,912 of Tennant et al., titled "Active-passive imager pixel array with small groups of pixels having short common bus lines"; U.S. Pat. No. 6,697,111 of Kozlowski et al., titled "compact low-noise active pixel sensor with progressive row reset"; U.S. Pat. No. 6,665,013 of Fossum et al., titled "active pixel sensor having intra-pixel charge transfer with analog-to-digital converter"; U.S. Pat. No. 6,587,142 of Kozlowski et al., titled "low-noise active-pixel sensor for imaging arrays with high speed row reset"; U.S. Pat. No. 6,538,245 of Kozlowski, titled "amplified CMOS transducer for single photon read-out of photo-detectors"; U.S. Pat. No. 6,532,040 of Kozlowski et al., titled "low-noise active-pixel sensor for imaging arrays with high-speed row reset"; U.S. Pat. No. 5,892,540 of Kozlowski et al., titled "low noise amplifier for passive pixel CMOS imager"; U.S. Pat. No. 5,238,276 of Dhuse et al., titled "imaging system having a sensor array reset noise reduction mechanism" and U.S. Pat. No. 6,326,230 of Pain et al., titled "high speed CMOS imager with motion artifact suppression and anti-blooming".

Correlated double sampling is a well known technique that can reduce thermal noise but it is based upon dedicated components that enable sampling of various signals. There is a need to provide efficient means to improve pixel performances.

SUMMARY OF THE INVENTION

A device having pixel reading capabilities, the device includes a pixel, a control circuit and a readout circuit connected to the pixel and to the control circuit; wherein the pixel includes a photo-detector, an input transistor, a second, third and fourth transistor; wherein the photo-detector and the input transistor are connected to a first node; wherein the input transistor, second and fourth transistors are connected to a second node; wherein the third transistor outputs a pixel output signal and is connected to the fourth transistor; and wherein the first, second and third transistors are controlled by control signals provided by the control circuit; wherein the device is adapted to: (i) activate a second transistor while maintaining the input transistor inactive; (ii) inactivate the second transistor; (iii) compensate for second node voltage change resulting from the inactivating of the second transistor by providing a feedback signal to a pixel node by utilizing at least one capacitance that capacitively couples the pixel node to the second node; and (iv) activate the input transistor and measure, by the readout circuit, the pixel output signal.

A device having pixel reading capabilities, the device includes a pixel, a control circuit and a readout circuit; wherein the pixel includes a photo-detector, an input transistor, a second, third and fourth transistor; wherein the photo-detector and the input transistor are connected to a first node; wherein the input transistor, second and fourth transistors are connected to a second node; wherein the third transistor outputs a pixel output signal and is connected to the fourth transistor; and wherein the first, second and third transistors are controlled by control signals provided by the control circuit; wherein the device is adapted to: (i) activate a second transistor that is connected to a second node, maintain an input transistor that is connected between the second node and an inactive photo-detector, and perform a first measurement of a pixel output signal; (ii) inactivate the second transistor and perform a second measurement of the pixel output signal; (iii) evaluate a second node voltage change resulting from the inactivation of the second transistor in response to a difference between a result of the first measurement and a result of the second measurement and to values of multiple capacitances that affect a charge distribution between the second node and a first node defined between the input transistor and the photo-detector; (iv) activate the input transistor and performing a third measurement of the pixel output signal; and (v) calculate a signal generated by the photo-detector in response to a result of the third measurement and in response to an evaluated second node voltage change.

A device having pixel writing capabilities, the device includes a pixel, a control circuit and a readout circuit connected to the pixel and to the control circuit; wherein the pixel includes a photo-detector, an input transistor, a second, third and fourth transistor; wherein the photo-detector and the input transistor are connected to a first node; wherein the input transistor, second and fourth transistors are connected to a second node; wherein the third transistor outputs a pixel output signal and is connected to the fourth transistor; and wherein the first, second and third transistors are controlled by control signals provided by the control circuit; wherein the device is adapted to: (i) activate the second transistor and the input transistor; (ii) inactivate the second transistor; (iii) compensate for second node voltage change resulting from the inactivating of the second transistor by providing a feedback signal to a pixel node by utilizing at least one capacitance that capacitively couples the pixel node to the second node via at least one capacitance; (iv) repeat, until a control criterion is fulfilled: (a) inactivate the input transistor, and measure, by the readout circuit, a pixel output signal; and (b) operate the input transistor in a weak conductive mode and provide to the pixel a feedback signal that is responsive to a result of the measurement of the pixel output signal.

Conveniently, the device is adapted to perform at least one repetition of an inactivation of the input transistor and operation of the input transistor if the control criterion is not fulfilled. According to an embodiment of the invention, the input transistor, when activated, is activated at a weak conductive mode during these repetitions.

According to an embodiment of the invention, the input transistor, when activated, is activated at a strong conductive mode during one or more of these repetitions and is then activated at a weak conductive mode.

A device having pixel writing capabilities, the device includes a pixel, a control circuit and a readout circuit connected to the pixel and to the control circuit; wherein the pixel includes a photo-detector, an input transistor, a second, third and fourth transistor; wherein the photo-detector and the input transistor are connected to a first node; wherein the input transistor, second and fourth transistors are connected to a second node; wherein the third transistor outputs a pixel output signal and is connected to the fourth transistor; and wherein the first, second and third transistors are controlled by control signals provided by the control circuit; wherein the device is adapted to: (i) activate the second transistor and the input transistor and perform, by the readout circuit, a first measurement of the pixel output signal; (ii) inactivate the second transistor and perform a second measurement of the pixel output signal; (iii) inactivate the input transistor, and perform a new measurement of the pixel output signal; (iv) operate the input transistor in a and provide to the pixel a feedback signal that is responsive to a result of the new measurement of the pixel output signal; (v) determine whether a control criterion is fulfilled in response to results of multiple measurements of the pixel output signal and to values of multiple capacitances that affect a charge distribution between the second node and the first node; and (vi) repeat an inactivation of the input transistor and operation of the input transistor if the control criterion is not fulfilled.

Conveniently, the device is adapted to perform at least one repetition of an inactivation of the input transistor and operation of the input transistor if the control criterion is not fulfilled. According to an embodiment of the invention the input transistor, when activated, is activated at a weak conductive mode during these repetitions.

According to an embodiment of the invention, the input transistor, when activated, is activated at a strong conductive mode during one or more of these repetitions and is then activated at a weak conductive mode.

A method for reading a pixel, the method includes: (i) activating a second transistor that is connected to a second node while maintaining an input transistor that is connected between the second node and a photo-detector inactive; (ii) inactivating the second transistor; (iii) compensating for second node voltage change resulting from the inactivating of the second transistor by providing a feedback signal to a pixel node via at least one capacitance that capacitively couples the pixel node to the second node; and (iv) activating the input transistor and measuring a pixel output signal.

A method for reading a pixel, the method includes: (i) activating a second transistor that is connected to a second node, maintaining an input transistor that is connected between the second node and a photo-detector inactive, and performing a first measurement of a pixel output signal; (ii) inactivating the second transistor and performing a second measurement of the pixel output signal; (iii) evaluating a second node voltage change resulting from the inactivating of the second transistor in response to a difference between a result of the first measurement and a result of the second measurement and to values of multiple capacitances that affect a charge distribution between the second node and a first node defined between the input transistor and the photo-detector; (iv) activating the input transistor and performing a third measurement of the pixel output signal; and (v) calculating a signal generated by the photo-detector in response to a result of the third measurement and in response to an evaluated second node voltage change.

A method for writing to a pixel, the method includes: (i) activating a second transistor that is connected to a second node and activating an input transistor that is connected between the second node and a first node that is connected to a photo-detector; (ii) inactivating the second transistor; (iii) compensating for second node voltage change resulting from the inactivating of the second transistor by providing a feedback signal to a pixel node via at least one capacitance that capacitively couples the pixel node to the second node; (iv) repeating, until a control criterion is fulfilled, the stages of: (a) inactivating the input transistor, and measuring a pixel output signal; and (b) operating the input transistor and providing to the pixel a feedback signal that is responsive to a result of the measurement of the pixel output signal.

According to an embodiment of the invention, during one or more iterations of stage (iv.b) the input transistor is operated in a strong conductive mode and during one or more iterations of stage (iv.b) the input transistor is operated in a weak conductive mode.

According to another embodiment of the invention, the input transistor is operated in a weak conductive mode during the various iterations of stage (iv.b).

A method for writing to a pixel, the method includes: (i) activating a second transistor that is connected to a second node, activating an input transistor that is connected between the second node and a first node that is connected to a photo-detector and performing a first measurement of a pixel output signal; (ii) inactivating the second transistor and performing a second measurement of the pixel output signal; (iii) inactivating the input transistor, and performing a new measurement of the pixel output signal; (iv) operating the input transistor in a weak conductive mode and providing to the pixel a feedback signal that is responsive to a result of the new measurement of the pixel output signal; (v) determining whether a control criterion is fulfilled in response to results of multiple measurements of the pixel output signal and to values of multiple capacitances that affect a charge distribution between the second node and the first node; and (vi) jumping to the stage of inactivating if the control criterion is not fulfilled.

According to an embodiment of the invention, during one or more iterations of stage (iv) the input transistor is operated in a strong conductive mode and during one or more iterations of stage (iv) the input transistor is operated in a weak conductive mode.

According to another embodiment of the invention, the input transistor is operated in a weak conductive mode during the various iterations of stage (iv.b).

BRIEF DESCRIPTION OF THE DRAWINGS

The present invention will be understood and appreciated more fully from the following detailed description taken in conjunction with the drawings in which:

FIG. 14 is a flow chart of a method for writing to a pixel, according to another embodiment of the invention.

DETAILED DESCRIPTION OF THE DRAWINGS

In the context of the present patent application and the claims "active" and "conductive" are assumed to be equivalent terms. In the context of the present patent application and the claims "inactive" and "non-conductive" are assumed to be equivalent terms. In the context of the present patent application and the claims "weak conductive" and "sub threshold" and "weak inversion" are assumed to be equivalent terms.

It is noted that the term "capacitance" can describe a parasitic capacitance, a non-parasitic capacitor or a combination thereof. A capacitance can be defined within a single pixel or can be defined between one pixel to the other, between one pixel to a wire, between one wire to another, and the like.

Figure 1:
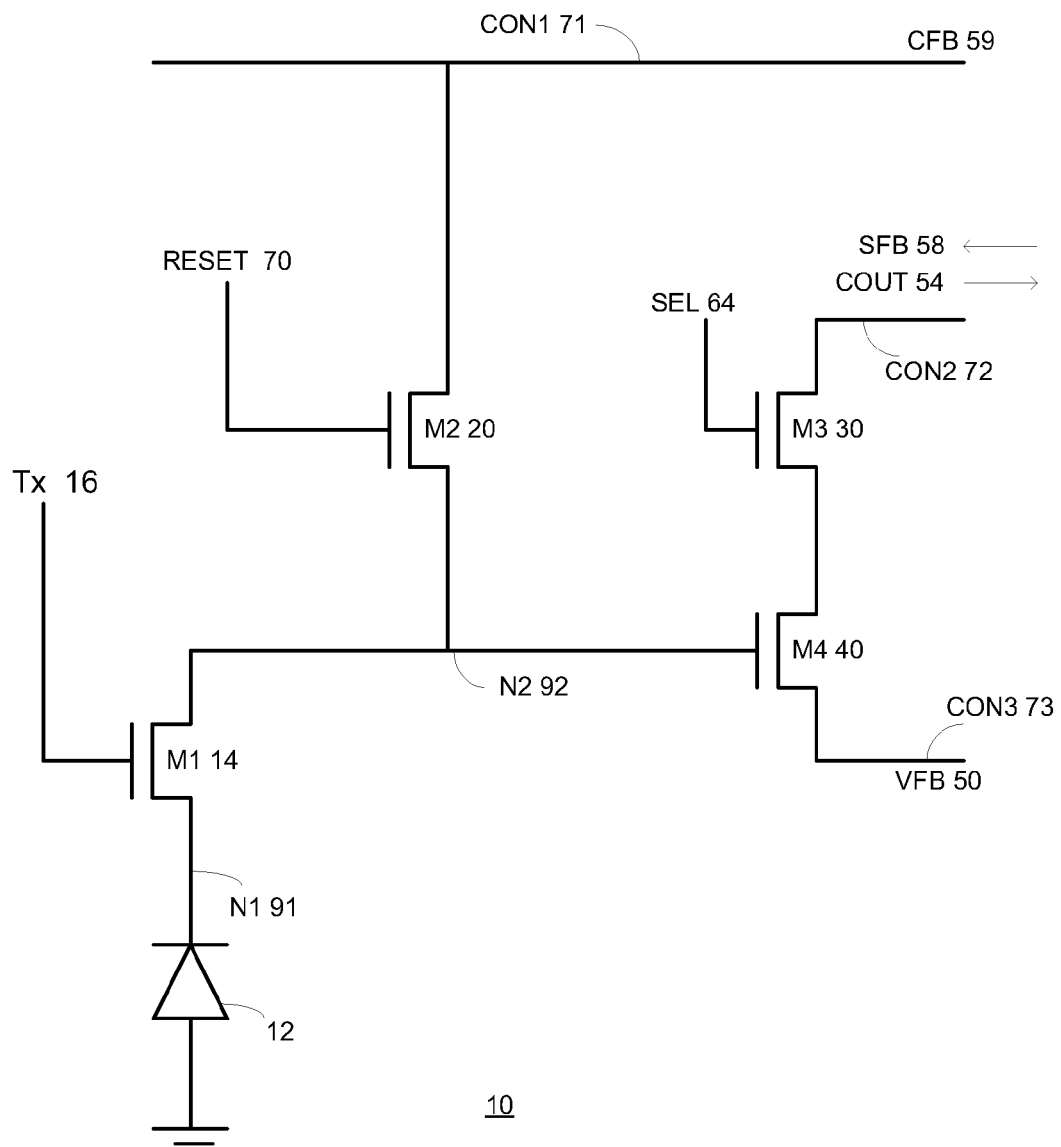
FIG. 1 illustrates a pixel according to various embodiments of the invention.

FIG. 1 illustrates pixel 10 according to an embodiment of the invention.

Pixel 10 includes photo-detector 12, input transistor 14, second transistor 20, third transistor 30 and fourth transistor 40. For simplicity of explanation FIG. 1 illustrates NMOS transistors, although other types of transistors (PMOS, non-CMOS transistors) can be used.

Conveniently, pixel 10 receives various control signals (such as RESET 56, SEL 52 and Tx 16) from a control circuit (not shown). It is also connected to three conductors. At least two of these conductors are also connected to a readout circuit (not shown).

First conductor (denoted CON1) 71 is connected to the drain of second transistor M2 20. It can convey a feedback signal such as current feedback signal CFB 59.

A pixel output signal (such as COUT 54) can be outputted from the drain of third transistor M3 30 to second conductor (denoted CON2 72). It is noted that second conductor 72 can be used to provide a feedback signal (denoted SFB 58) to the pixel.

Third conductor (denoted CON3) 73 is connected to the source of fourth transistor M4 40. It can convey a feedback signal such as voltage feedback signal VFB 50.

The source of input transistor M1 14 is connected to photo-detector 12 at first node N1 91. The gate of input transistor M1 14 receives row selection signal Tx 58. The drain of input transistor M1 14 is connected to second node N2 22. Second node N2 22 is also referred to as Floating Diffusion (FD) node 22.

The source of second transistor M2 20 is connected to second node N2 92. The gate of second transistor M2 20 receives reset signal RESET 56.

The source of third transistor M3 30 receives VFB 50. The gate of third transistor M3 30 is connected to second node N2 92. The drain of third transistor M3 30 is connected to the source of fourth transistor 40. The source of fourth transistor M4 40 is connected to the drain of third transistor M3 30. The gate of fourth transistor M4 40 receives column select signal SEL 52.

Input transistor M1 12 is also referred to as signal transfer transistor or transfer gate transistor. Second transistor M2 20 is also referred to as reset transistor. Third transistor M3 30 is also referred to as sense transistor.

Pixel 10 operates in a current mode—the pixel output signal is current. It is noted that voltage mode pixels can be used and that the value of a pixel output signal can be its voltage level.

The operation of pixel 10 will be discussed below, and especially will be discussed in relation to the various flowcharts of FIGS. 7-10.

Pixel 10 can be read or set to a certain value (reset value or a write-back value) by utilizing one or more capacitances that affect the second node voltage level. This is done without directly providing a signal to second node N2 92. Additionally or alternatively, a charge generated on photo-detector can be evaluated in response to pixel output signal measurements and in response to multiple capacitances that can affect the charge distribution between second node N2 92 and first node N1 91.

It is noted that the voltage (potential) of the second node (N2) can be measured by reading out the output signal of the pixel (voltage or current). The output signal of the pixel is supplied to column readout channel COUT 54. Alternatively, pixel input and output (VFB and COUT) can be switched, so that the pixel output would be supplied by VFB line. However, for simplicity of explanation measurement via COUT is illustrated in more detail in the specification.

Figure 2:
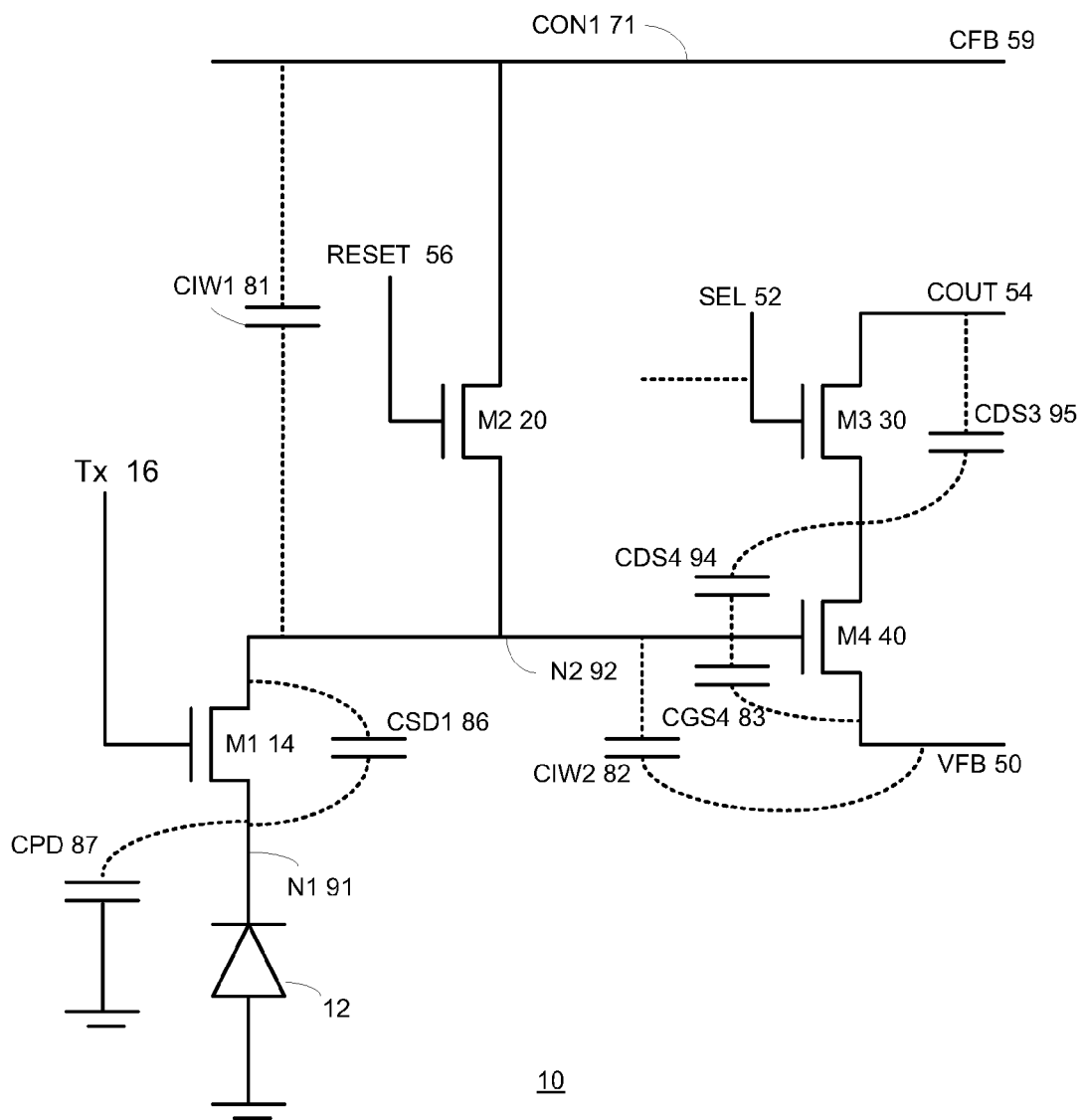
FIG. 2 illustrates a pixel as well as various capacitances, according to an embodiment of the invention.

FIG. 2 illustrates pixel 10 as well as various capacitances, according to an embodiment of the invention.

These capacitances include inter-wire capacitances such as CIW1 81 and CIW2 82, transistor capacitances CGS4 83, CDS4 84, CDS3 85, CDS1 86 and photo-detector capacitance CPD 87.

First inter-wire capacitance CIW1 81 represents an inter-wire capacitance between first conductor 71 and second node N2 92. Second inter-wire capacitance CIW2 82 represents an inter-wire capacitance between a third conductor 73 and second node N2 92. Transistor capacitance CGS4 83 represents the gate source capacitance of fourth transistor M4 40. Transistor capacitance CDG4 84 represents the drain gate capacitance of fourth transistor M4 40. Transistor capacitance CDS3 85 represents the drain source capacitance of third transistor M3 30. Transistor capacitance CDS1 86 represents the drain source capacitance of input transistor M1 14.

It is noted that other capacitances exist and that not all mentioned above capacitances substantially contribute to the mentioned below processes.

The second node voltage level can be affected by a value of one or more feedback signals such as CFB 59, VFB 50 and SFB 58. The one or more feedback signals are provided to pixel nodes that differ than second node N2 92 but are capacitively coupled to second node N2 92. Accordingly, a signal that is provided over the first till third conductors will affect the second node voltage level by capacitive coupling.

Furthermore, a capacitance of second node N2 92, the capacitance (CSD1 86) of input transistor M1 14 and the capacitance (CPD 87) of photo-detector 87 affect the charge distribution between first and second nodes N1 91 and N2 92. The capacitance of second node N2 92 can be responsive to one or more of the mentioned above capacitances. An inactivation of second transistor M2 20 causes a noise signal to be distributed between the first and second node in response to these capacitances.

Figure 3:
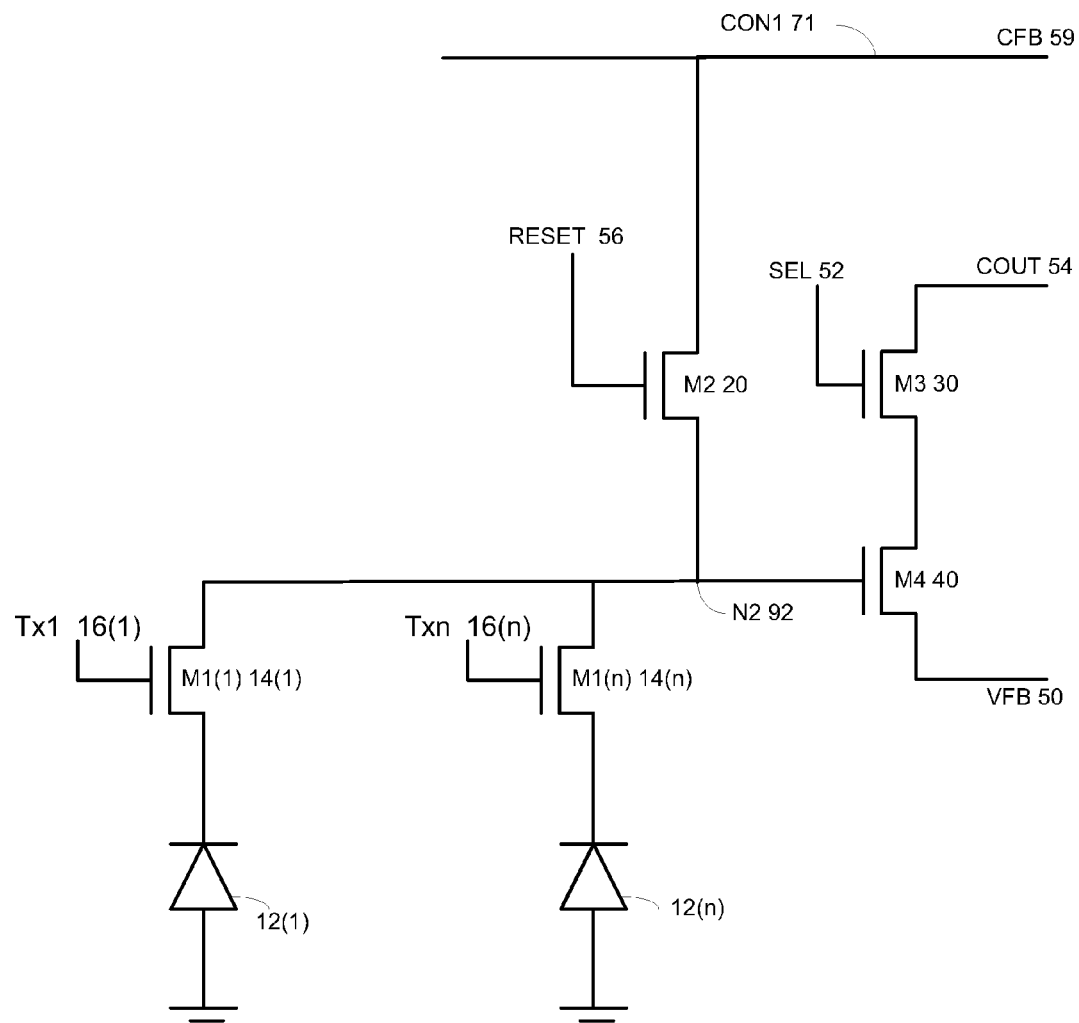
FIG. 3 illustrates a shared pixel according to another embodiment of the invention.

FIG. 3 illustrates shared pixel 11 according to another embodiment of the invention.

Shared pixel 11 of FIG. 3 differs from pixel 10 of FIG. 1 by including a group of photo-detectors (12(1)-12(n)) and a group of input transistors (14(1)-14(n)) instead of a single photo-detector 12 and a single input transistor 14. Each photo-detector is connected to a single input transistor.

The drains of input transistors 14(1)-14(n) are connected in parallel to second node N2 22. Each gate of an input transistor out of input transistors 14(1)-14(n) receives a row selection signal out of row selection signals TX1-TXn. Typically, only one input transistor is activated at a given moment. Each pair of input transistor and photo-detector defines its own (first) node. It is assumed that if an input transistor is closed it does not substantially affect a charge distribution between the second node and a first node of an open input transistor.

Figure 4:
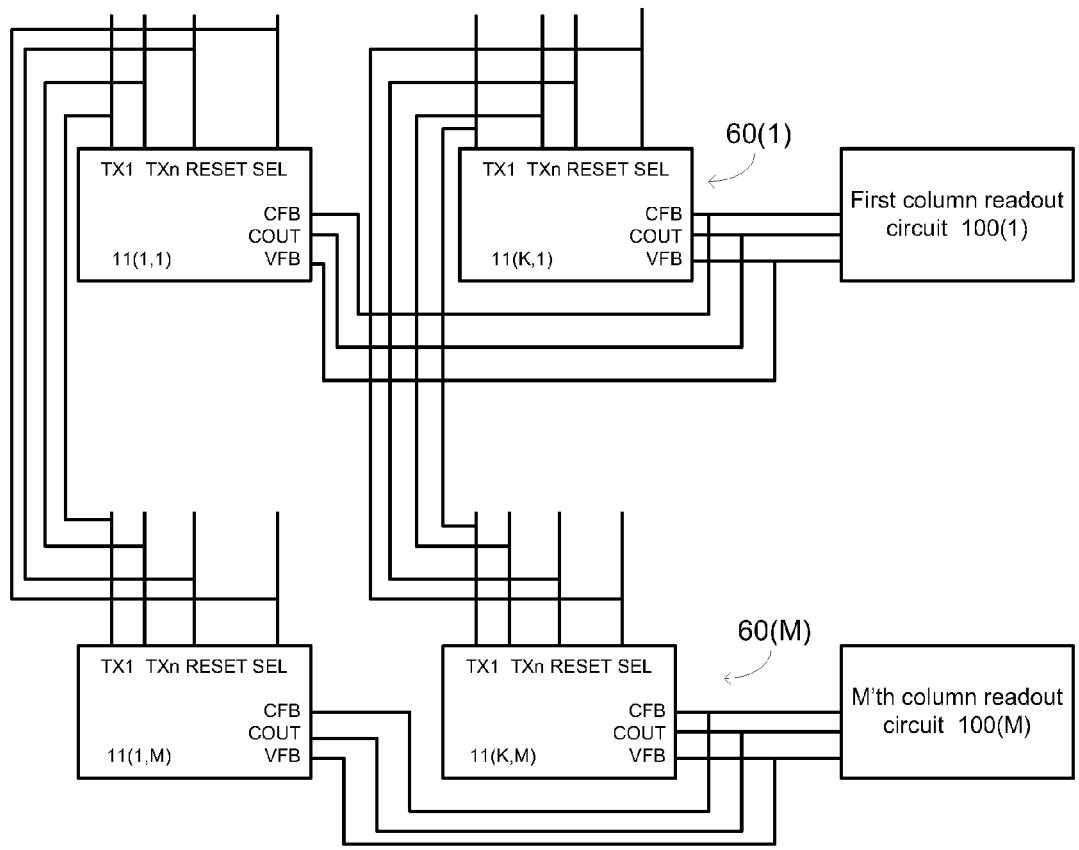
FIG. 4 illustrates a portion of a device that includes multiple groups of pixels, according to an embodiment of the invention.

FIG. 4 illustrates a device 101 that include multiple groups of pixels 11(1, 1)-11(K,M) according to an embodiment of the invention.

Device 101 includes an array of shared pixels 11(1,1)-11(K,M) and includes a readout circuit 100 that in turn includes multiple column readout circuits 100(1)-100(M). A column readout circuit is allocated per a shared pixel column.

It is noted that this is not necessarily so and (for example) readout circuit 100 can include more than one readout circuit per column or can include a readout circuit per more than a single columns.

Device 101 includes an array of photo-detectors. This array includes M columns and (n*K) rows that are arranged in M*K shared pixels 11(1, 1)-11(K,M).

The m'th shared pixel column 60(m) includes shared pixels 11(1,m)-11(K,m). Index m ranges between 1 and M. Shared pixel column 60(m) is connected to the m'th column readout circuit 100(m).

It is noted that multiple shared pixels can be connected in parallel to each other. A column readout circuit can be connected to a column of shared pixels by two or three conductors. Using fewer conductors usually enables more light to impinge upon the photo-detectors but requires sharing one or more conductors between multiple columns of shared pixels.

FIG. 4 illustrates a configuration in which three conductors (such as first till third conductors 71-73 of FIG. 1) are connected between each shared pixel and a column readout circuit.

Figure 5:
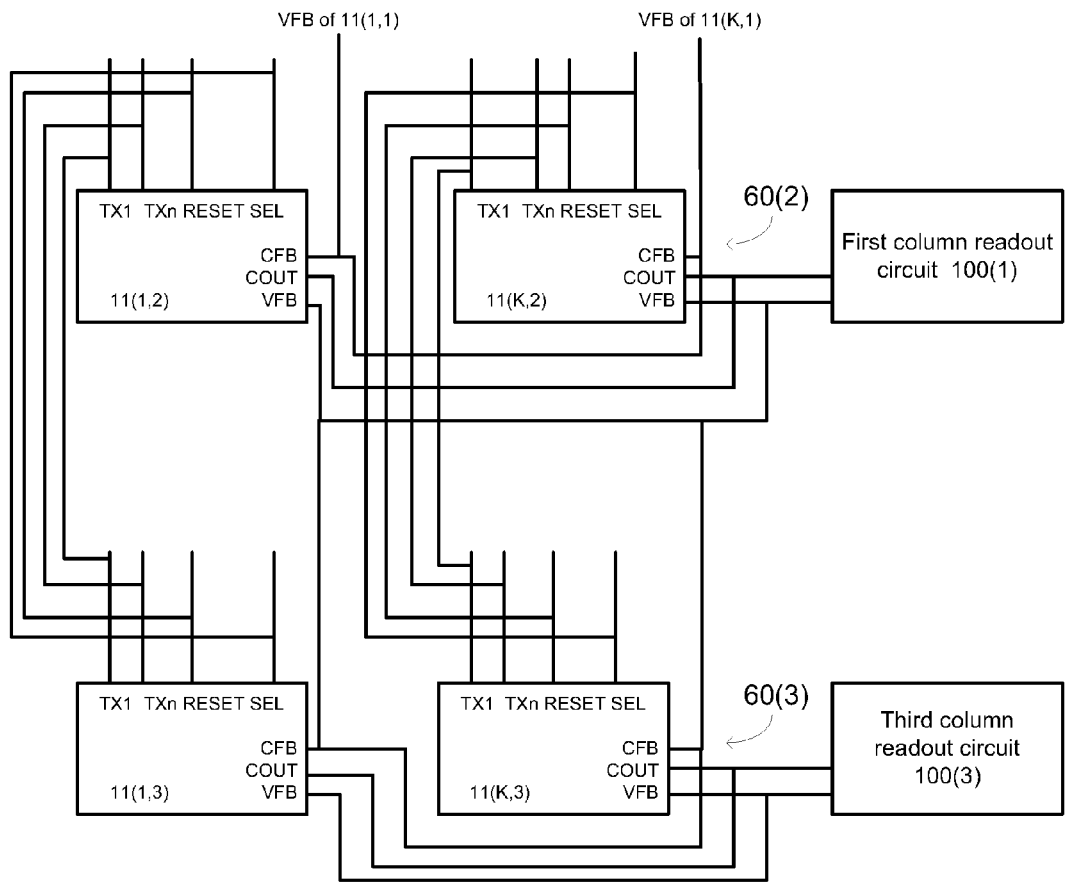
FIG. 5 illustrates two shared pixel columns and two column readout circuits, according to another embodiment of the invention.

FIG. 5 illustrates two shared pixel columns 60(2) and 60(3) and two column readout circuits 100(2) and 100(3), according to another embodiment of the invention.

In FIG. 5 each column readout circuit is connected to a pair of conductors. One of these conductors is shared by shared pixels that belong to two successive shared pixel columns.

Second column readout circuit 100(2) is connected by a conductor to the drains of third transistors of shared pixels of second column of shared pixels 60(2) and is connected by another conductor to the sources of fourth transistors of shared pixels of second column of shared pixels 60(2) as well as to the drains of second transistors of shared pixels of third column of shared pixels 60(3).

In other words, the same conductor is used to convey the voltage feedback signal (VFB 50) of shared pixels that belong to second column of shared pixels 60(2) and to convey the current feedback signal (CFB 59) of shared pixels that belong to third column of shared pixels 60(3).

It is noted that device 101 and 102 can include one or more controllers and that at least a portion a controller can be integrated with a readout circuit. The one or more controllers send the various control signals such as RESET 56, Tx 58, and SEL 52.

Figure 6A:
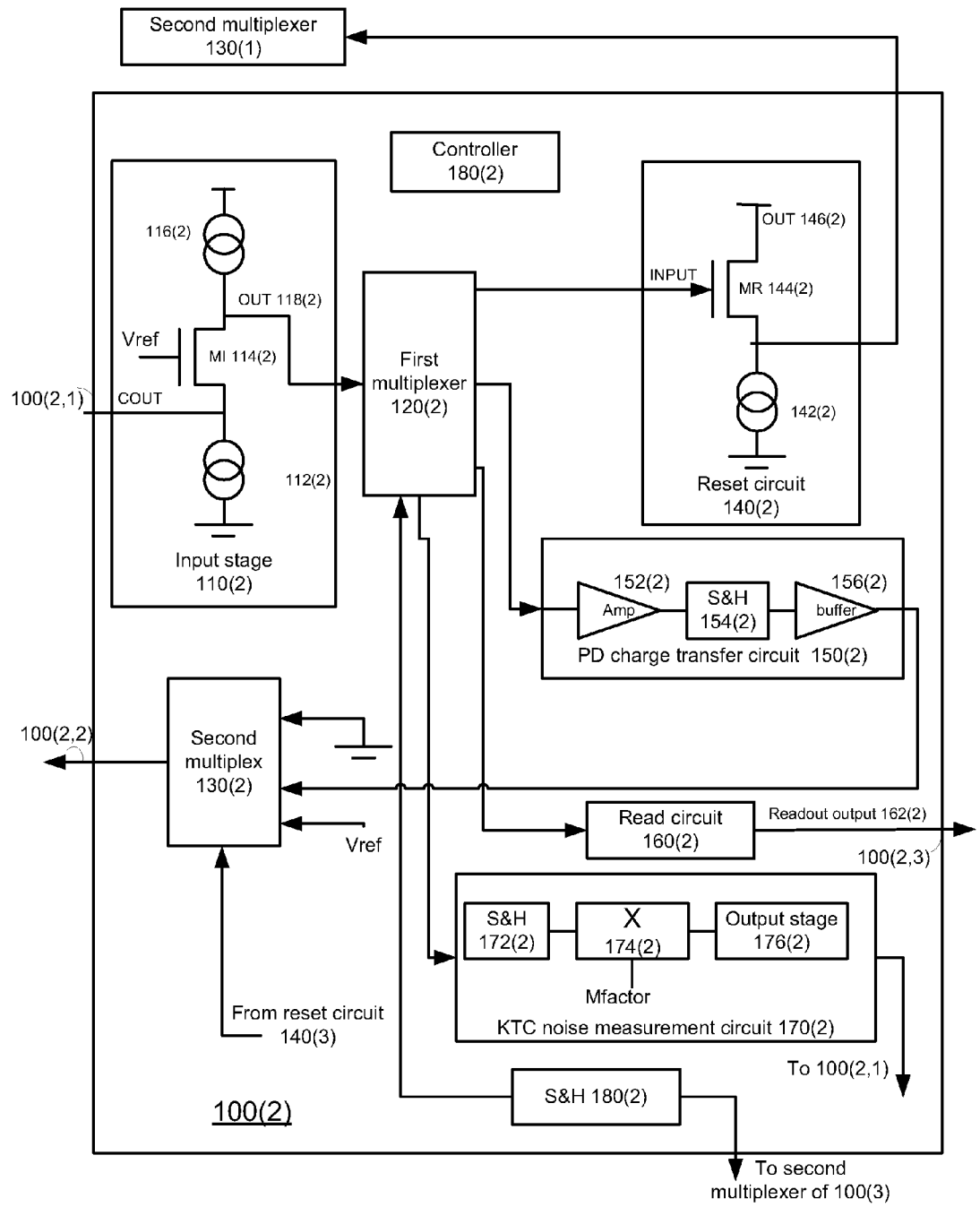
FIGS. 6a-6b illustrate second column readout circuits, according to various embodiments of the invention.

FIG. 6a illustrates second column readout circuit 100(2), according to an embodiment of the invention.

FIG. 6 illustrates a configuration that resembles the dual conductor configuration of FIG. 5.

Second column readout circuit 100(2) includes input stage 110(2), first multiplexer 120(2), second multiplexer 130(2), reset circuit 140(2), photo-detector (PD) charge transfer circuit 150(2), read circuit 160(2), KTC noise measurement circuit 170(2) and sample and hold circuit 180(2).

Input stage 110(2) is connected to an input of first multiplexer 120(2). Different outputs of first multiplexer 120(2) are connected to reset circuit 140(2), photo-detector (PD) charge transfer circuit 150(2), read circuit 160(2), KTC noise measurement circuit 156(2) and a sample and hold circuit 180(2). The output of sample and hold circuit 180(2) is connected to an input of second multiplexer 130(3) of third column readout circuit 100(3).

Second column readout circuit 100(2) includes three nodes—100(2,1), 100(2,2) and 100(2,3) that are connected to circuits outside readout circuit 100. Second column readout circuit 100(2) is also connected to first column readout circuit 100(1) and to third column readout circuit 100(3).

First node 100(2,1) is connected to a second conductor (such as second conductor 72) that may convey a pixel output signal (COUT) and also convey a feedback signal such as SFB.

Second node 100(2,2) is connected to a third conductor (such as third conductor 72) that may convey a feedback signal such as VFB to shared pixels of second shared pixel column 60(2) and may convey a feedback signal such as CFB to shared pixels that belong to third shared pixel column 60(3).

The output of KTC noise measurement circuit 170(2) is connected to the input of input stage 110(2). Additionally or alternatively the output signal of KTC noise measurement circuit 170(2) can be added to the output signal of input stage 110(2) and the summed signal is provided to the input of multiplexer 120(2).

The output of reset circuit 140(2) is connected to an input of second multiplexer 130(1) of first column readout circuit 100(1). The output of PD charge transfer circuit 150(2) is connected to an input of second multiplexer 130(2).

Input stage 110(2) as well as circuits 120(2)-170(2) can receive timing and control signals. These timing and control signals are not illustrated, for simplicity of explanation. The source of the timing and control signals is represented by controller 180(2).

Different inputs of second multiplexer 130(2) are connected to the ground, to a reference voltage (Vref), to an output of PD charge transfer circuit 150(2) and to an output of reset circuit 140(3) of third column readout circuit 100(3). Vref can be high (even substantially equal to a supply voltage).

It is further noted that FIG. 6a also illustrates exemplary configurations of input stage 110(2), reset circuit 140(2) and PD charge transfer circuit 150(2).

Input stage 110(2) can receive, via first node 110(2,1) pixel output signal COUT from an activated shared pixel of the second column of shared pixels 60(2).

Input stage 110(2) operates as a buffer and provides a low impedance input. It includes transistor MI 114(2) and two current sources 112(2) and 116(2). The gate of input transistor MI 114(2) is connected to a reference voltage Vref. The drain of input transistor MI 114(2) is connected to current source 116(2). The source of input transistor MI 114(2) is connected to first node 110(2,1) and to another current source 112(2).

The input of first multiplexer 120(2) is connected to output node 118(2) of input stage 110(2). Output node 118(2) is also connected to current source 116(2) and to the drain of transistor MI 114(2). It is noted that input stage 110(2) can be bypassed.

Reset circuit 140(2) provides low impedance output for fast settling (fast writing process). This reset circuit can be omitted, if a fast reset process is not required.

Reset circuit 140(2) includes transistor MR 144(2) and current source 142(2). The gate of transistor MR 144(2) is connected to an output of first multiplexer 140(2). The drain of transistor MR 144(2) is connected (at an output node 146(2) of reset circuit 140(2)) to a supply voltage. The source of transistor MR 144(2) is connected to current source 142(2).

PD charge transfer circuit 150(2) is able to sample a signal that represents the pixel output signal, store that sampled signal and then (at the appropriate timing) output a voltage feedback signal such as VFB 50. It conveniently includes amplifier 152(2), sample and hold circuit 154(2) and an output buffer 156(2), connected in a sequential manner.

Read circuit 160(2) can include one or more sample and hold circuits. It can sample a signal representative of a pixel output signal and generate an output signal (also termed readout output 162(2)) that is sent via node 100(2,4) of second column readout circuit 100(2).

It is noted that the polarity of PD charge transfer circuit 150(2) can depend upon the type of feedback signal it sends to the pixel. For example, it should be designed as a non-inverting stage if the feedback signal is a voltage signal; and designed as an inverting stage if the feedback signal is a current signal. It is further noted, that when the feedback signal is not provided via CON1 71 then the feedback signal can be provided via output 100(2,1) and/or 100(2,1).

Figure 6B:
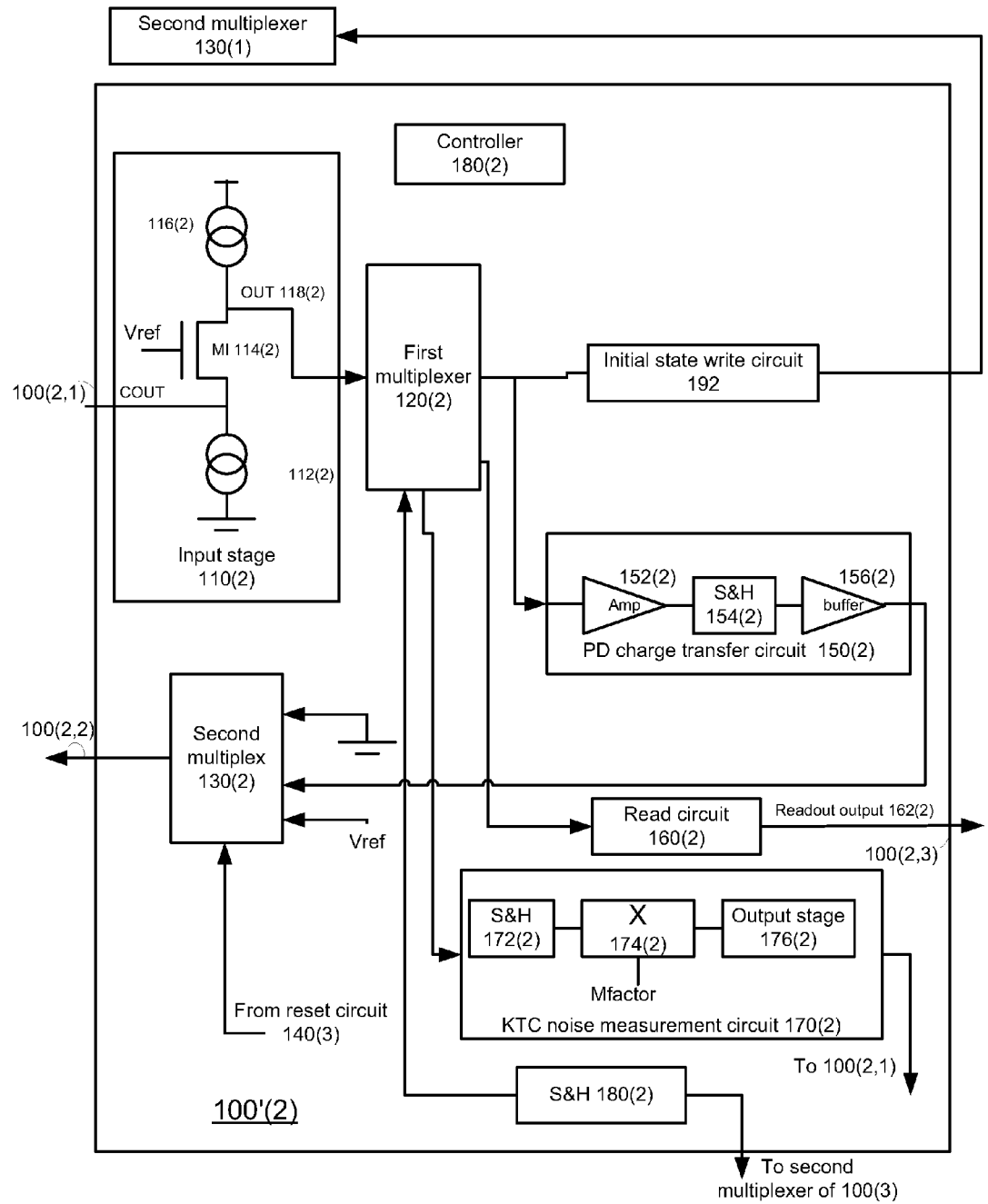

FIG. 6b illustrates second column readout circuit 100'(2), according to an embodiment of the invention. FIG. 6b illustrates a configuration that resembles the triple conductor configuration of FIG. 4.

Conveniently, second column readout circuit 100'(2) includes initial write circuit 192(2) (instead of reset circuit 140(2) of FIG. 6a) that controls the multiple feedback cycles. Initial write circuit 192(2) is connected between second multiplexer 120(2) (of second column readout circuit 100'(2)) and first multiplexer 139(1) of a first column readout circuit.

The functionality of circuits 120(2)-170(2) will be further explained below, in reference to FIGS. 7-10.

FIGS. 7-10 illustrates various methods for reading a pixel and for writing to a pixel. These methods are conveniently applied on a pixel such as pixel 10 or shared pixel 11.

In various methods mentioned below, multiple stages can be repeated until a control criterion is fulfilled. The control criterion can define a number of allowed repetitions, define a repetition period, define a convergence of a sequence of stages, or a combination thereof. It is noted that if the control criterion is not completed (for example—a sequence of stages did not converge during a predefined period) the method can define that pixel as a erroneous pixel and pixel information can be calculated based upon neighboring pixels (for example—by using interpolation).

In various methods mentioned below, a ratio (or relationship) between capacitors is mentioned. It is noted that according to an embodiment of the invention a method can be responsive to the ratio, to the fraction or the ratio, can try to converge to a result that depends upon the ratio but still different from the ratio.

Figure 7:
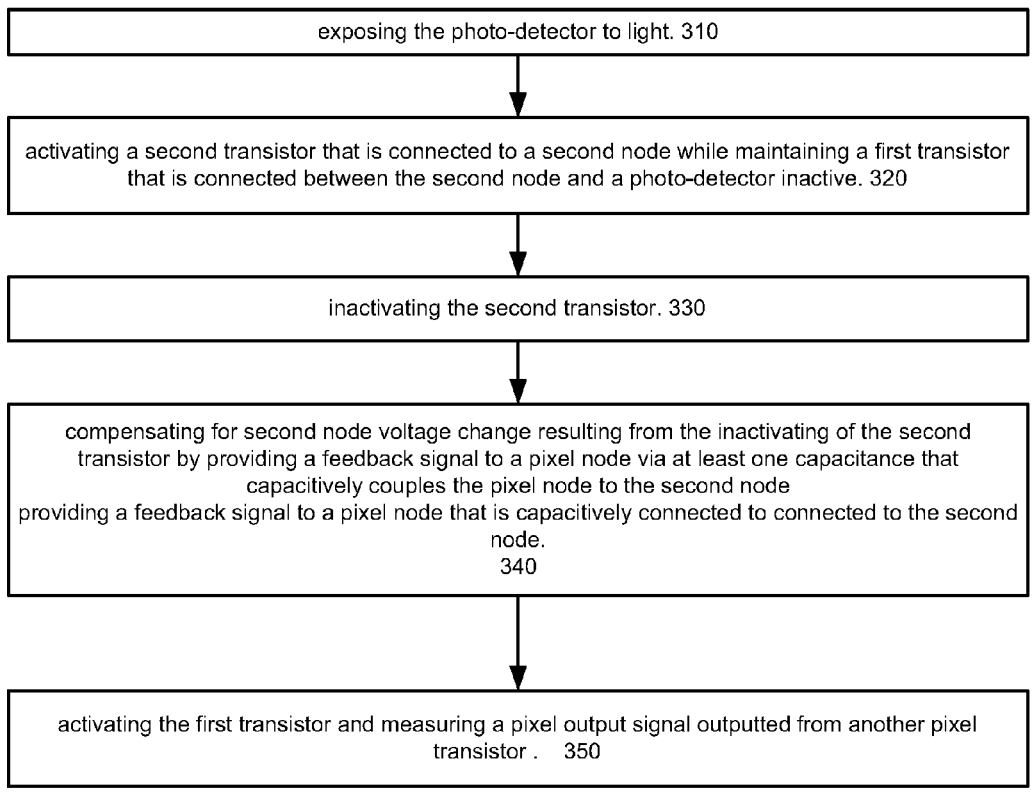
FIG. 7 is a flow chart of a method for reading a pixel, according to an embodiment of the invention.

FIG. 7 illustrates method 300 for reading a pixel, according to an embodiment of the invention.

Method 300 starts by stage 310 of exposing a photo-detector to light. This is called the integration stage. Typically, while certain pixels operate in an integration mode other pixels are activated in read or write mode. It is noted that write mode can include resetting the pixel or performing a write back from one pixel to another.

Stage 320 is followed by stage 330 of activating a second transistor that is connected to a second node while maintaining an input transistor that is connected between the second node and a photo-detector inactive.

Stage 330 is followed by stage 340 of inactivating the second transistor (putting the second transistor at a non-conductive mode).

Stage 340 is followed by stage 350 of compensating for second node voltage change resulting from the inactivating of the second transistor by providing a feedback signal to a pixel node via at least one capacitance that capacitively coupled the pixel node to the second node.

Assuming that three conductors (such as first till third conductors 71-73) connect each shared pixel to a column readout circuit than the feedback signal can be CFB, VFB or a feedback signal conveyed over the same conductor that conveys COUT. Conveniently, this feedback signal can be provided from PD charge transfer circuit 150(2).

Assuming that three conductors (such as first till third conductors 71-73) connect each shared pixel to a column readout circuit than the feedback signal can be CFB, VFB or a feedback signal conveyed over the same conductor that conveys COUT. Conveniently, this feedback signal can be provided from PD charge transfer circuit 150(2).

Referring to the example set forth in FIG. 6 and assuming that a pixel of the second column is written to then second multiplexer 130(2) provides over node 100(2,2) a VFB signal.

Conveniently, stage 350 of compensating includes providing a feedback signal to a pixel node that is capacitively connected to the second node via a transistor capacitance. Referring to the example set fourth in FIG. 1, this feedback signal can be either one of VFB 50 and a feedback signal conveyed over first conductor 71.

Conveniently, stage 350 of compensating includes providing two feedback signals to two pixel nodes that are capacitively connected to the second node via transistors capacitances. Referring to the example set fourth in FIG. 1, these two feedback signals can be VFB 50 and a feedback signal conveyed over first conductor 71.

Conveniently, stage 350 of compensating includes providing one or more feedback signals to a pixel node that is capacitively connected to the second node via an inter-conductor capacitance. Referring to the example set fourth in FIG. 1, this feedback signal can be CFB 60.

Stage 350 is followed by stage 360 of activating the input transistor and measuring a pixel output signal.

Figure 8:
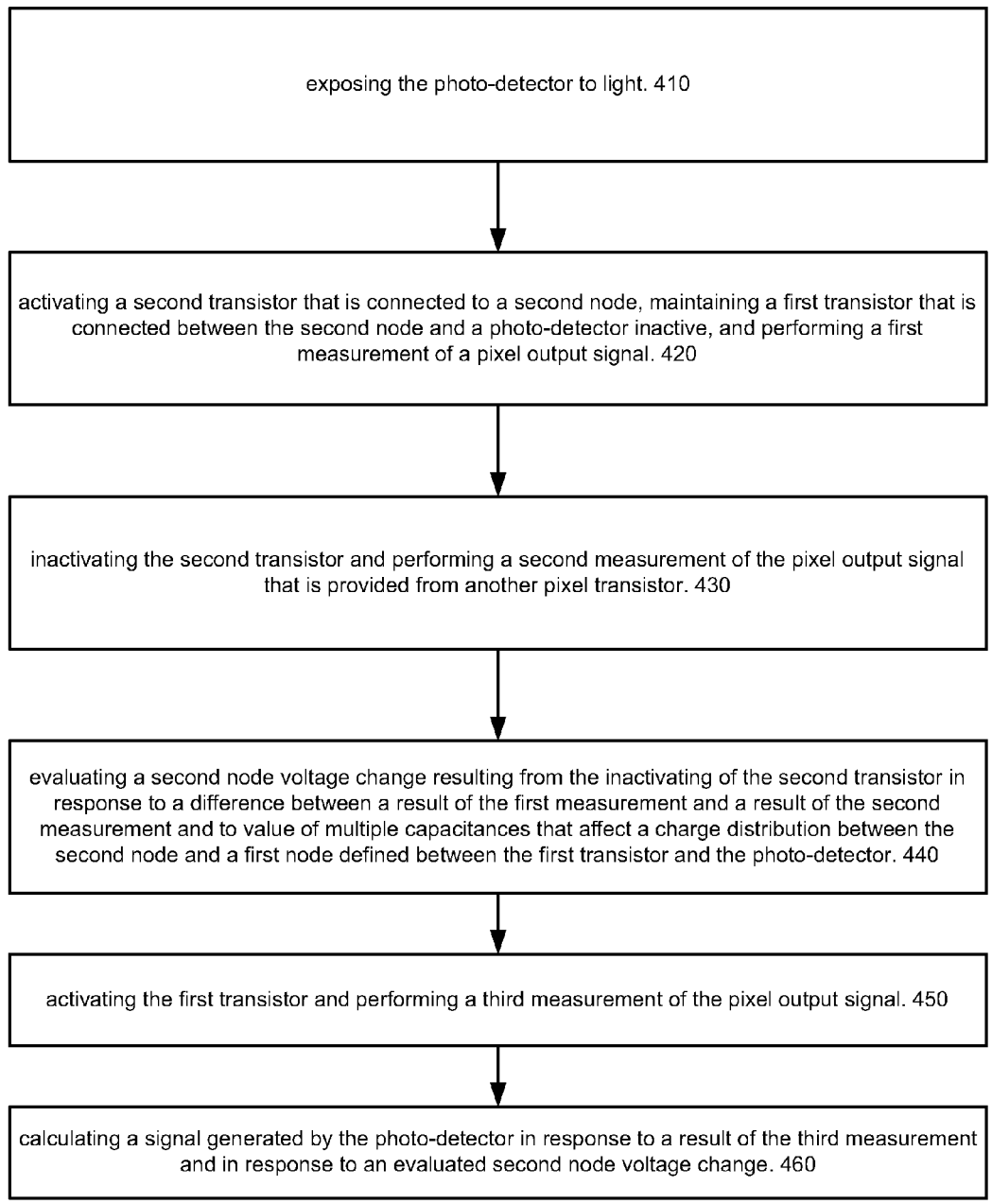
FIG. 8 is a flow chart of a method for reading a pixel, according to an embodiment of the invention.

FIG. 8 illustrates method 400 for reading a pixel, according to an embodiment of the invention.

Method 400 starts by stage 410 of exposing a photo-detector to light. This is called the integration stage. Typically, while certain pixels operate in an integration mode other pixels are activated in read or write mode. It is noted that write mode can include resetting the pixel or performing a write back from one pixel to another.

Stage 410 is followed by stage 420 of activating a second transistor that is connected to a second node, maintaining an input transistor that is connected between the second node and a photo-detector inactive, and performing a first measurement of a pixel output signal. Referring to the example set fourth in FIG. 6, the measurement can be made by KTC noise measurement circuit 170(2).

Stage 420 is followed by stage 430 of inactivating the second transistor and performing a second measurement of the pixel output signal. Referring to the example set fourth in FIG. 6, the measurement can be made by KTC noise measurement circuit 170(2).

Stage 430 is followed by stage 440 of evaluating a second node voltage change resulting from the inactivating of the second transistor in response to a difference between a result of the first measurement and a result of the second measurement and to values of multiple capacitances that affect a charge distribution between the second node and a first node defined between the input transistor and the photo-detector.

Stage 440 is followed by stage 450 of activating the input transistor and performing a third measurement of the pixel output signal.

Stage 450 is followed by stage 460 of calculating a signal generated by the photo-detector in response to a result of the third measurement and in response to an evaluated second node voltage change.

Conveniently, stage 440 of evaluating includes evaluating the second node voltage change in response to a value of input transistor capacitance, to a value of first node capacitance and to a value of second node capacitance.

Conveniently, stage 440 of evaluating includes evaluating the second node voltage change in response to a ratio between a value of a second node capacitance and between a sum of the value of the second node capacitance, a value of input transistor capacitance and a value of first node capacitance.

Figure 9:
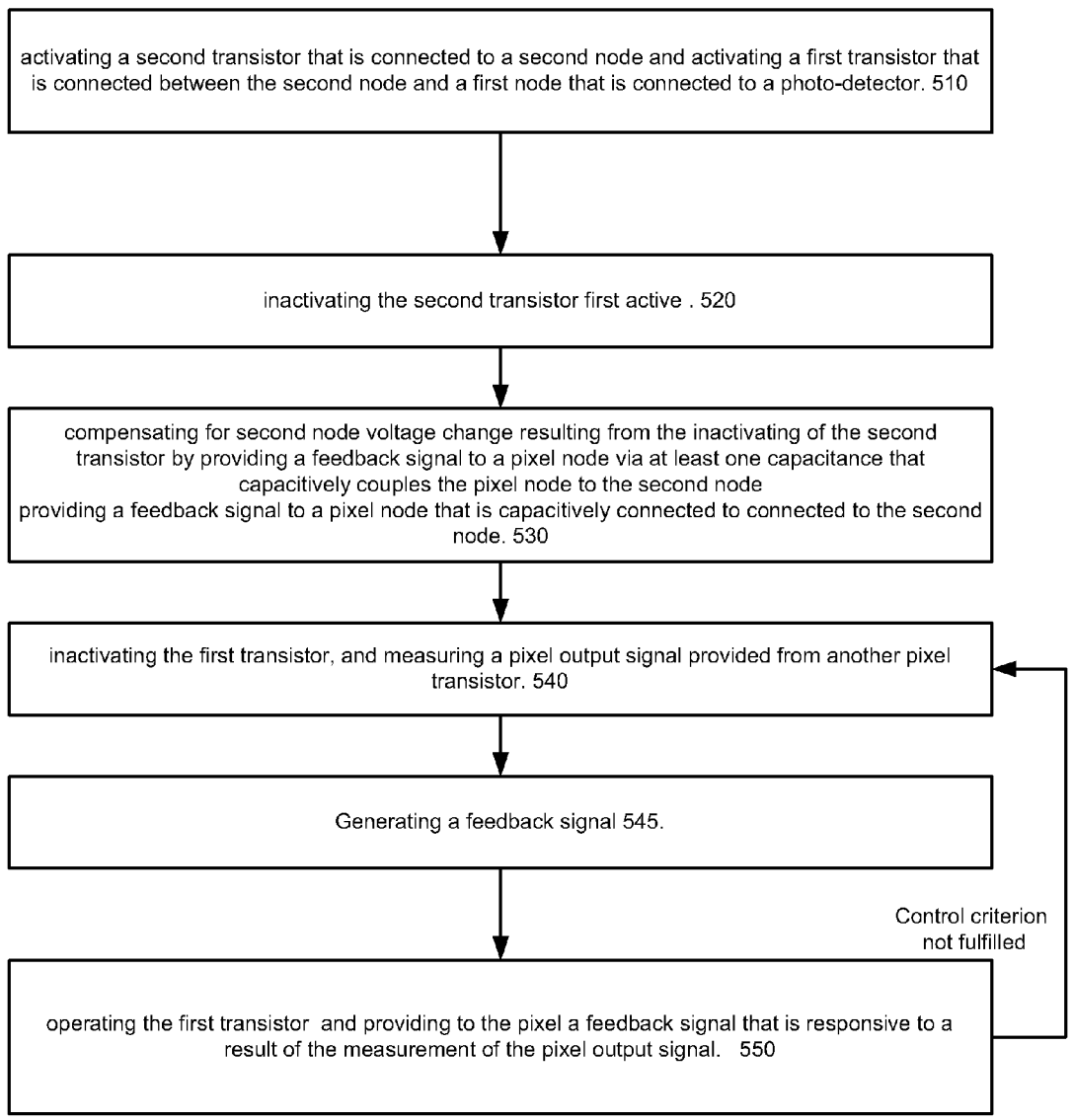
FIG. 9 is a flow chart of a method for writing to a pixel, according to an embodiment of the invention.

FIG. 9 illustrates method 500 for writing to a pixel, according to an embodiment of the invention.

Method 500 starts by stage 510 of activating a second transistor that is connected to a second node and activating an input transistor that is connected between the second node and a first node that is connected to a photo-detector. Stage 510 includes resetting (or writing another initial value) the first and second nodes of the pixel.

Stage 510 is followed by stage 520 of inactivating the second transistor.

Stage 520 is followed by stage 530 of compensating for second node voltage change resulting from the inactivating of the second transistor by providing a feedback signal to a pixel node via at least one capacitance that capacitively coupled the pixel node to the second node.

Stage 530 involves compensating for a noise signal such as a KTC noise signal.

Stage 530 can end by charging the first node to a high voltage level. This will enable to perform photo-detector charge transfer (stage 550) by discharging the first node. Typically, discharge operations are easier to implement. This change can include providing a high reference voltage (Vref) via second multiplexer 130(2).

Stage 530 is followed by a sequence of stages that are repeated until a control criterion is fulfilled.

The sequence of stages starts by stage 540 of inactivating the input transistor, and measuring a pixel output signal. This measurement provides an indication of the second node voltage level.

Stage 540 is followed by stage 545 of generating a feedback current. The feedback current is responsive to the result of the measurement.

Conveniently, stage 545 includes generating a feedback current by amplifying the pixel output current by a gain factor that is responsive to the difference between the pixel output current and the target pixel output current.

Stage 545 is followed by stage 550 of operating the input transistor and providing to the pixel a feedback signal that is responsive to a result of the measurement of the pixel output signal. This stage involves transferring charge between the first and second nodes.

Once stage 550 ends the fulfillment of the control criterion is evaluated. This is illustrated by an arrow from stage 550 to stage 540 that indicates a repetition if the control criterion was not fulfilled.

Conveniently, stage 540 includes measuring a pixel output current and the control criterion represents a relationship between the pixel output current and a target pixel output current.

According to an embodiment of the invention multiple repetitions of stage 550 (until the control criterion is fulfilled) can start by operating the input transistor (during one or more repetitions of stage 550) in a strong conductive mode. These one or more iterations can be followed by operating the input transistor (during one or more iterations of stage 550) in a weak conductive mode. The combination of one or more strong conductive mode iterations of stage 550 that are followed by at least one weak conductive mode iteration of stage 550 can speed up method 500.

It is noted that during one or more iterations of stage 550 the photo detector is charged to a voltage level that can be higher than a target voltage on second node 92. The differences between the target voltage on second node 92 and settled voltage can be small, for example, of order of noise fluctuations.

Conveniently, stage 545 includes generating a feedback signal in response to multiple capacitances that affect a charge distribution between the second node and a first node defined between the input transistor and the photo-detector. These capacitances can include an input transistor capacitance, to a first node capacitance and to a second node capacitance. Conveniently, the feedback current is responsive to a ratio between a second node capacitance and between a sum of the second node capacitance, an input transistor capacitance and a first node capacitance.

It is noted that method 500 can be applied in order to reset a pixel (writing a reset value to the pixel) or in order to store a value representative of a state of another pixel (write-back). Accordingly, the control criterion can be fulfilled once the pixel is reset or once the pixel stores the write-back value.

According to an embodiment of the invention stage 520 is preceded by optional stage 515 of setting a first node voltage to a high level. In this case stage 500 will include lowering the first node voltage level.

Figure 10:
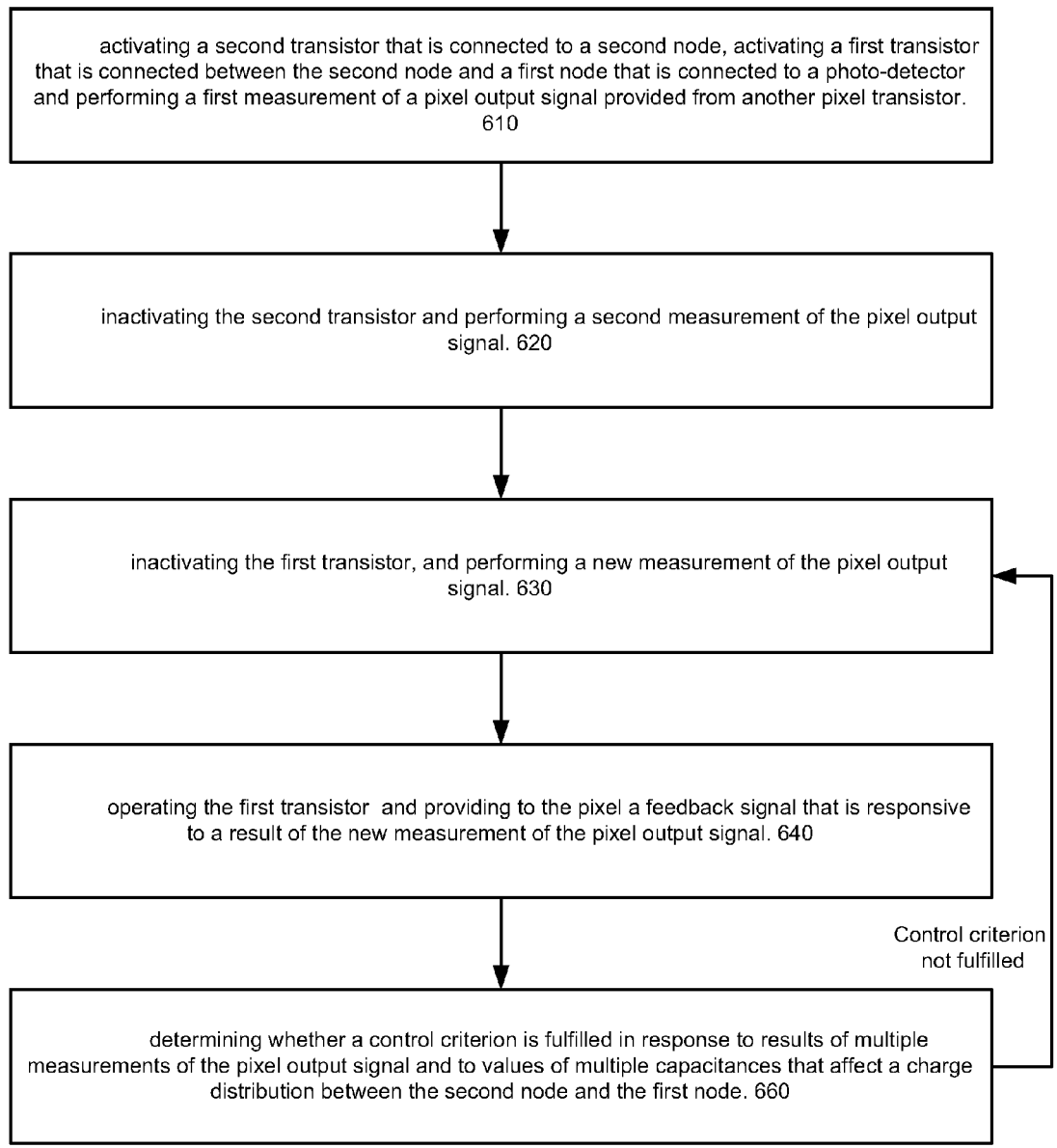
FIG. 10 is a flow chart of a method for writing to a pixel, according to another embodiment of the invention.

FIG. 10 illustrates method 600 for writing to a pixel, according to an embodiment of the invention.

Method 600 starts by stage 610 of activating a second transistor that is connected to a second node, activating an input transistor that is connected between the second node and a first node that is connected to a photo-detector and performing a first measurement of a pixel output signal. Stage 610 includes resetting (or writing another initial value) the first and second nodes of the pixel.

Stage 610 can include measuring the pixel output signal by the KTC noise measurement circuit.

Stage 610 is followed by stage 620 of inactivating the second transistor and performing a second measurement of the pixel output signal. Stage 620 can include measuring the pixel output signal by the KTC noise measurement circuit.

Stage 620 is followed by stage 630 of inactivating the input transistor, and performing a new measurement of the pixel output signal. Stage 630 can end by charging the first node to a high voltage level. This will enable to perform photo-detector charge transfer (stage 540) by discharging the first node. Typically, discharge operations are easier to implement.

Stage 630 can include measuring the pixel output signal by the KTC noise measurement circuit.

Conveniently, stage 630 includes connecting (via first multiplexer 120(2)) input stage to PD charge transfer circuit 150(2) and sampling the signal outputted from input stage 110(2).

Stage 630 is followed by stage 640 of operating the input transistor and providing to the pixel a feedback signal that is responsive to a result of the new measurement of the pixel output signal.

Referring to the example set forth in previous figures, the feedback signal can be outputted by PD charge transfer circuit 150(2) and sent, via second multiplexer 130(2) to fourth transistor 40. During stage 640 PD charge transfer circuit 150(2) is disconnected from input multiplexer 120(2).

According to an embodiment of the invention, multiple repetitions of stage 640 (until the control criterion is fulfilled) can start by operating the input transistor (during one or more repetitions of stage 640) in a strong conductive mode. These one or more iterations can be followed by operating the input transistor (during one or more iterations of stage 640) in a weak conductive mode. The combination of one or more strong conductive mode iterations of stage 640 that are followed by at least one weak conductive mode iteration of stage 640 can speed up method 600.

Stage 640 is followed by stage 650 of determining whether a control criterion is fulfilled in response to results of multiple measurements of the pixel output signal and to values of multiple capacitances that affect a charge distribution between the second node and the first node. If the control criterion is fulfilled method 600 ends, else stage 650 is followed by stage 630.

It is noted that once the input transistor is operated in weak conversion it actually provides a pole, whilst when operating in a strong conversion the pole should be provided by the readout circuit.

Stage 650 includes evaluating the noise (such as KTC noise) that appears at the second node of the pixel.

Conveniently, the determination of stage 650 is responsive to a value of input transistor capacitance, to a value of first node capacitance and to a value of second node capacitance. Conveniently, the determination is responsive to a ratio between a value of a second node capacitance and between a sum of the value of the second node capacitance, a value of input transistor capacitance and a value of first node capacitance.

Conveniently, the determination is responsive to a difference between a pixel output signal target value and between a product of: (i) a difference between results of successive measurements of pixel output values, and (ii) a ratio between a value of a second node capacitance and between a sum of the value of the second node capacitance, a value of input transistor capacitance and a value of first node capacitance.

The invention can be applied to sensors other than optical sensors. For example image sensors sensitive to electric field, biometric input sensors, or chemical sensors.

The invention can be applied in applications requiring a low-noise read-out from one-dimensional or multi-dimensional array of cells outputting signal in form of voltage, current or charge. The output signal can be either in continuous analog form or in quantized form representing discrete one-level or multi-level value.

The invention can be applied in applications requiring multiple iterative read-write cycles and can greatly reduce the accumulated noise by using this invention, in applications requiring a very accurate low-noise sampling of analog continuous or quantized signal on a capacitor or even in all purpose switched capacitor circuits that sample analog continuous or quantized signal.

It is noted that although the pixel can operate in a reset phase, read out phase and integration phase mode this is not necessarily so. The pixel can operate in different other phases such as fast coarse and slow fine reset phases, gain calibration phase, offset calibration phase, various double and triple correlated sampling phases and more.

According to an embodiment of the invention, only two lines are used to provide feedback signals and to read information from a pixel. For example, a connector such as CON1 71 is not used to provide a feedback signal, but rather CON2 72 and/or CON3 73. Accordingly, instead of providing a feedback signal via CON1 71 the feedback signal can be provided by the following stages: disconnecting the second transistor (M2 20) conveniently by placing it in strong inversion, evaluating the state of second node N2 92 (via CON2 72 or CON3 73), then providing a feedback signal in view of the state. These stages can be repeated until the second node is in a desired state. Referring to some of the above-mentioned figures, these stages can replace stage 340 of FIG. 7 or stage 540 of FIG. 9. It is noted that when applying this scheme the source of M2 20 can be connected to CON2 (72) or CON3 (73) and not to CON 1 71. It is further noted that the output of PD charge transfer circuit 150(2) can be connected to CON2 or CON3 (and not to CON1 via second multiplexer 130(2)).

According to another embodiment of the invention a process of reading a pixel includes attempting to set the voltage level of the second node to a certain target value. The target value can, for example, reflect the value of that voltage level before exposing of the photo-detector to light. The target value can also be responsive to first transistor charge injection level.

Figure 11:
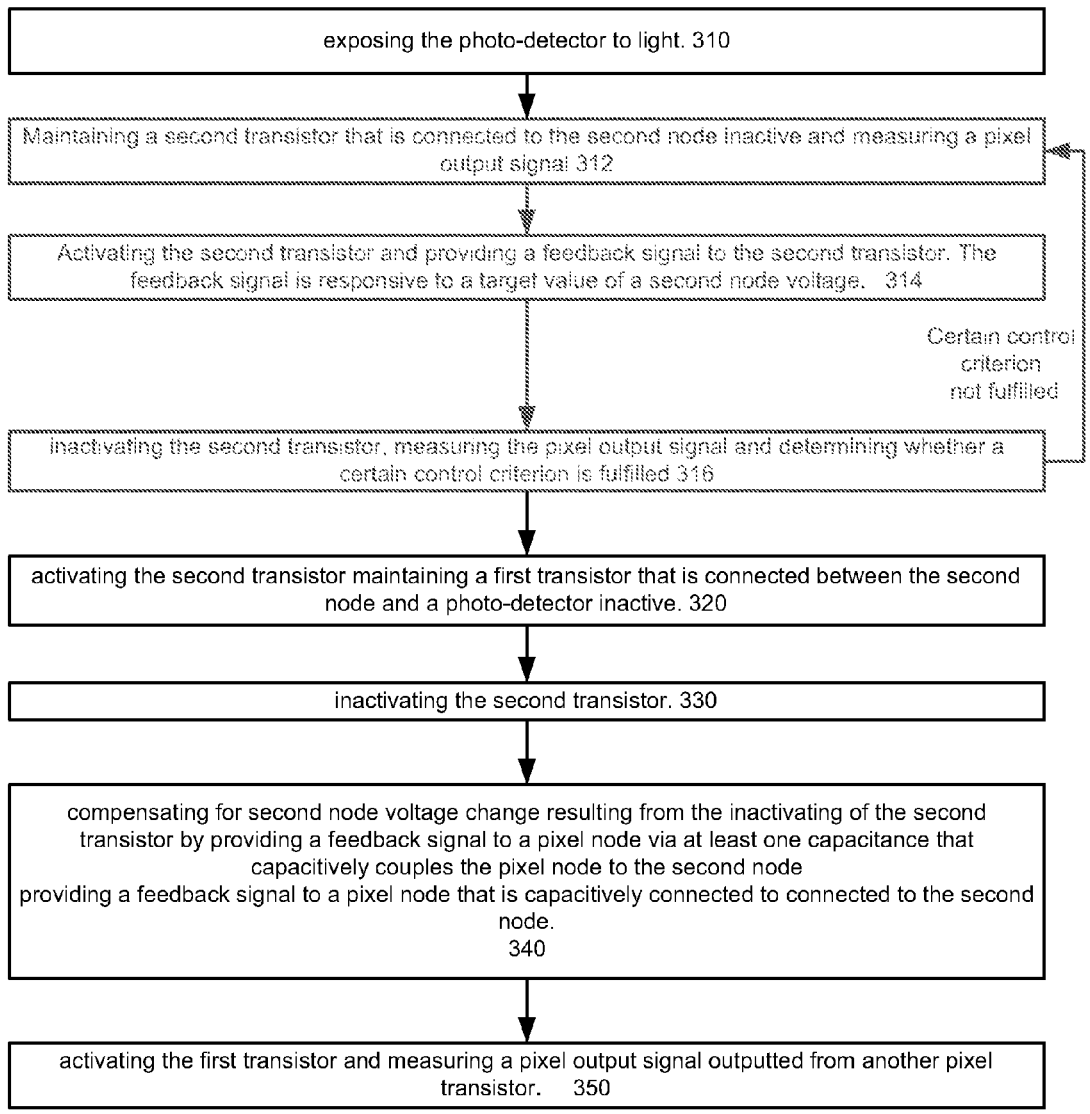
FIG. 11 is a flow chart of a method for reading a pixel, according to another embodiment of the invention.
Figure 12:
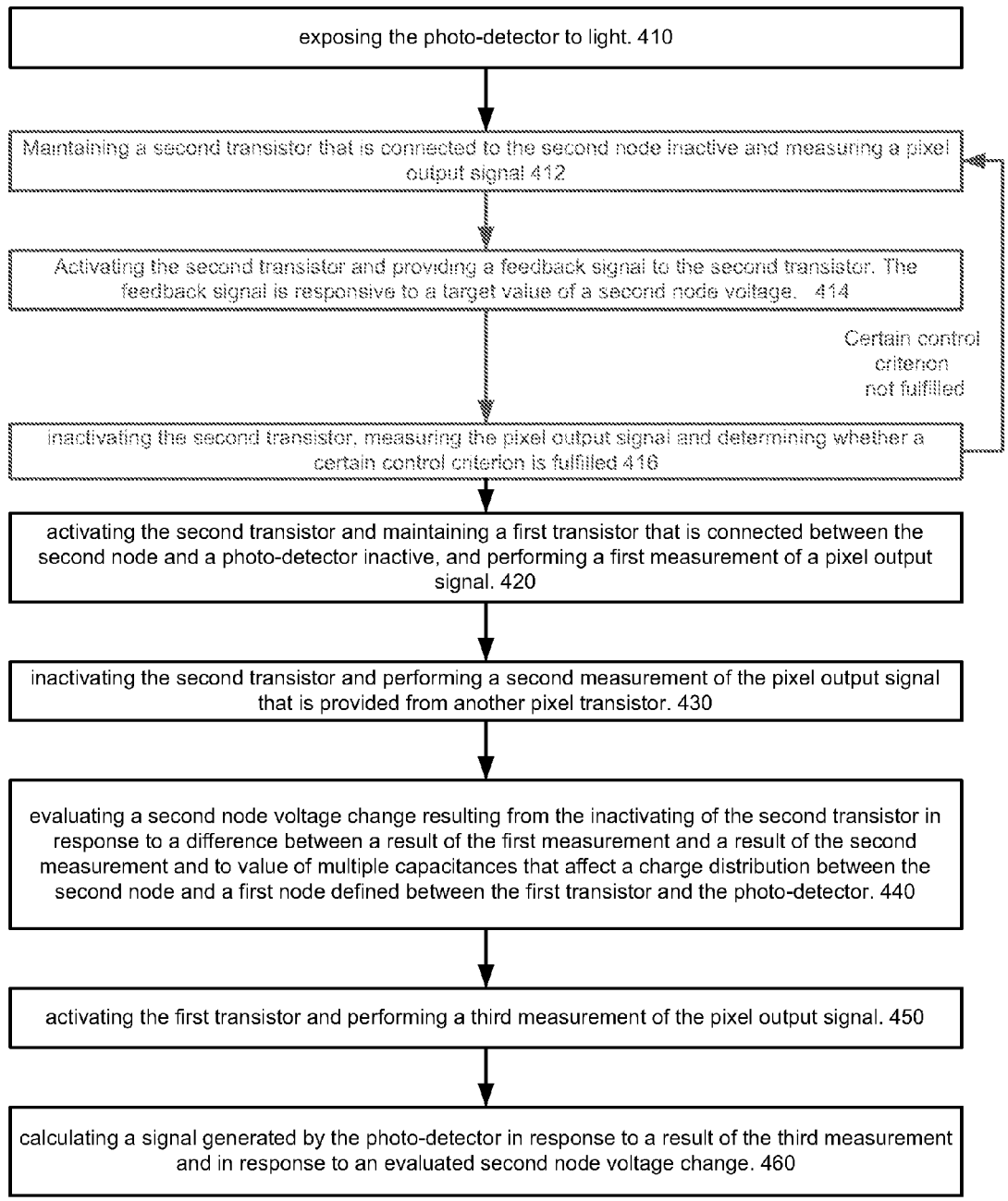
FIG. 12 is a flow chart of a method for reading a pixel, according to another embodiment of the invention.

It is noted that these attempts can be executed in an iterative manner, as further illustrated in FIGS. 11 and 12. The repetitions can continue until a certain control criterion is fulfilled. The certain control criterion can relate to the number of iterations, to the relationship between the target value and the achieved value, and the like.

FIG. 10 is a flow chart method 300' for writing to a pixel, according to another embodiment of the invention.

Method 300' differs from method 300 of FIG. 7 by including stages 312-316. Stage 310 is preceded by stage 310 and stage 316 is followed by stage 320.

Stage 312 includes maintaining the second transistor inactive and measuring a pixel output signal. This pixel output signal can reflect the voltage level of the second node.

Stage 312 is followed by stage 314 of activating the second transistor and providing a feedback signal to the second transistor. The feedback signal is responsive to the target value of the second node voltage.

Stage 314 is followed by stage 316 of maintaining the second transistor inactive, measuring a pixel output signal and determining whether a certain control criterion was fulfilled. If the certain control criterion is fulfilled then stage 312 is followed by stage 320, else it is followed by stage 312.

FIG. 12 is a flow chart of method 400' for reading a pixel, according to another embodiment of the invention.

Method 400' differs from method 400 of figure by including stages 412-416. Stage 410 is preceded by stage 410 and stage 416 is followed by stage 420.

Stage 412 includes maintaining the second transistor inactive and measuring a pixel output signal. This pixel output signal can reflect the voltage level of the second node.

Stage 412 is followed by stage 414 of activating the second transistor and providing a feedback signal to the second transistor. The feedback signal is responsive to the target value of the second node voltage.

Stage 414 is followed by stage 416 of maintaining the second transistor inactive, measuring a pixel output signal and determining whether a certain control criterion was fulfilled. If the certain control criterion is fulfilled then stage 412 is followed by stage 420, else it is followed by stage 412.

According to another embodiment of the invention a process of writing to a pixel includes attempting to set the voltage level of the second node to a target value. The target value can, for example, reflect the value of that voltage level at the end of a previous write cycle. Typically, the previous write cycle is followed by a read cycle. The target value can also be responsive to various alterations (such as ground changes) between these write cycles.

Figure 13:
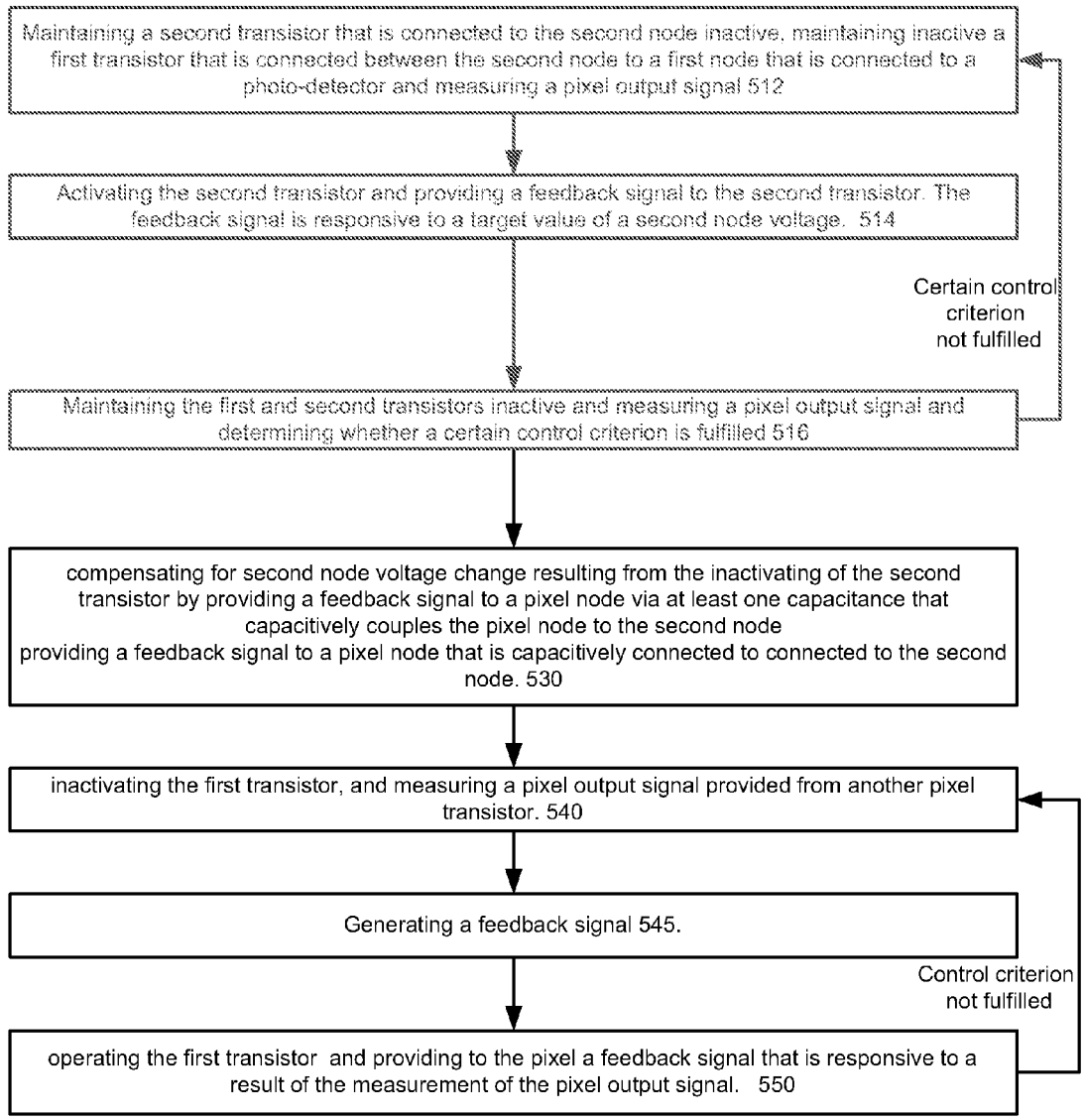
FIG. 13 is a flow chart of a method for writing to a pixel, according to another embodiment of the invention.

It is noted that these attempts can be executed in an iterative manner, as further illustrated in FIGS. 13 and 14. The repetitions can continue until a certain control criterion is fulfilled. The certain control criterion can relate to the number of iterations, to the relationship between the target value and the achieved value, and the like.

FIG. 13 is a flow chart of method 500' for reading a pixel, according to another embodiment of the invention.

Method 500' differs from method 500 of figure by including stages 512-516 instead of stage 510 and 520.

Stage 512 includes maintaining the first transistor and the second transistor inactive and measuring a pixel output signal. This pixel output signal can reflect the voltage level of the second node.

Stage 512 is followed by stage 514 of activating the second transistor and providing a feedback signal to the second transistor. The feedback signal is responsive to the target value of the second node voltage. The first transistor can be maintained at any state.

Stage 514 is followed by stage 516 of maintaining the second transistor inactive, measuring a pixel output signal and determining whether a certain control criterion was fulfilled. If the certain control criterion is fulfilled then stage 516 is followed by stage 530, else it is followed by stage 512. The first transistor can be maintained at any state.

FIG. 14 is a flow chart of method 600' for reading a pixel, according to another embodiment of the invention.

Method 600' differs from method 600 of figure by including stages 612-616 instead of stage 610 and 620.

Stage 612 includes maintaining the first transistor and the second transistor inactive and measuring a pixel output signal. This pixel output signal can reflect the voltage level of the second node.

Stage 612 is followed by stage 614 of activating the second transistor and providing a feedback signal to the second transistor. The feedback signal is responsive to the target value of the second node voltage. The first transistor can be maintained at any state.

Stage 614 is followed by stage 616 of maintaining the second transistor inactive, measuring a pixel output signal and determining whether a certain control criterion was fulfilled. If the certain control criterion is fulfilled then stage 616 is followed by stage 630, else it is followed by stage 612. The first transistor can be maintained at any state.

According to another embodiment of the invention a process of reading a pixel includes attempting to set the voltage level of the second node to a certain target value. The target value can, for example, reflect the value of that voltage level before exposing of the photo-detector to light. The target value can also be responsive to first transistor charge injection level.

It is noted that these attempts can be executed in an iterative manner, as further illustrated in FIGS. 11 and 12. The repetitions can continue until a certain control criterion is fulfilled. The certain control criterion can relate to the number of iterations, to the relationship between the target value and the achieved value, and the like.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

According to another embodiment of the invention a process of reading a pixel includes attempting to set the voltage level of the second node to a certain target value. The target value can, for example, reflect the value of that voltage level before exposing of the photo-detector to light. The target value can also be responsive to first transistor charge injection level.

I claim:

1. A method for writing to a pixel, the method comprising:
activating an input transistor and a second transistor; wherein the second transistor is coupled to a second node and the input transistor is coupled between the second node and a photo-detector;
inactivating the second transistor;
compensating for second node voltage change resulting from the inactivating of the second transistor by providing a feedback signal to a pixel node via a capacitance that capacitively couples the second node to the pixel node;
repeating, until a control criterion is fulfilled, the stages of:
inactivating the input transistor, and measuring a pixel output signal; and
operating the input transistor and providing to the pixel a feedback signal that is responsive to a result of the measurement of the pixel output signal.

2. The method according to claim 1 wherein the measuring comprises measuring a pixel output current and wherein the control criterion represents a relationship between the pixel output current and a target pixel output current.

3. The method according to claim 2 further comprising generating a feedback current by amplifying the pixel output current by a gain factor that is responsive to the difference between the pixel output current and the target pixel output current.

4. The method according to claim 1 further comprising generating a feedback current in response to multiple capacitances that affect a charge distribution between the second node and a first node defined between the input transistor and the photo-detector.

5. The method according to claim 2 further comprising generating a feedback current in response to an input transistor capacitance, to a first node capacitance and to a second node capacitance.

6. The method according to claim 2 further comprising generating a feedback current in response to a ratio between (i) a second node capacitance and between (ii) a sum of the second node capacitance, an input transistor capacitance and a first node capacitance.

7. The method according to claim 1 wherein the stage of inactivating the input transistor is preceded by setting a first node voltage to a high level and wherein the placing comprises lowering the first node voltage level; wherein the first node is defined between the input transistor and the photo-detector.

8. The method according to claim 1 wherein the control criterion is fulfilled once the pixel is reset.

9. The method according to claim 1 wherein the control criterion is fulfilled once the pixel stores a value representative of light that was detected by a photo detector of another pixel.

10. The method according to claim 1 wherein the stage of operating the input transistor in a weak conductive mode comprises operating the transistor at a sub-threshold mode.

11. The method according to claim 1 further comprising operating the input transistor in a weak conductive mode and providing a feedback signal to the pixel.

12. The method according to claim 11 further comprising activating the input transistor in a strong conductive mode.

13. The method according to claim 1 further comprising activating the input transistor in a strong conductive mode.

14. The method according to claim 1 further comprising attempting to set a voltage level of the second node to a target value.

15. The method according to claim 14 wherein the target value is responsive to a second node voltage level at an end of a previous write cycle.

16. The method according to claim 14 wherein the target value is responsive ground level alterations between different write cycles.

17. The method according to claim 14 wherein the attempting comprises performing multiple attempt iterations.

18. A device having pixel writing capabilities, the device comprises a pixel, a control circuit and a readout circuit coupled to the pixel and to the control circuit;
wherein the pixel comprises a photo-detector, an input transistor, a second, third and fourth transistor; wherein the photo-detector and the input transistor are connected to a first node; wherein the input transistor, second and fourth transistors are connected to a second node;
wherein the third transistor outputs a pixel output signal and is coupled to the fourth transistor; and wherein the first, second and third transistors are controlled by control signals provided by the control circuit;
wherein the device is adapted to:
activate a second transistor and the input transistor;
inactivate the second transistor;
compensate for second node voltage change resulting from the inactivating of the second transistor by providing a feedback signal via at least one capacitance that capacitively couples the pixel node to the second node;
repeat, until a control criterion is fulfilled:
inactivate the input transistor, and measure, by the readout circuit, a pixel output signal; and
operate the input transistor and provide to the pixel a feedback signal that is responsive to a result of the measurement of the pixel output signal.

19. The device according to claim 18 wherein the readout circuit is adapted to measure a pixel output current and wherein the control criterion represents a relationship between the pixel output current and a target pixel output current.

20. The device according to claim 19 wherein the readout circuit is adapted to generate a feedback current by amplifying the pixel output current by a gain factor that is responsive to the difference between the pixel output current and the target pixel output current.

21. The device according to claim 18 wherein the readout circuit is adapted to generate a feedback current in response to multiple capacitances that affect a charge distribution between the second node and a first node defined between the input transistor and the photo-detector.

22. The device according to claim 18 wherein the readout circuit is adapted to generate a feedback current in response to an input transistor capacitance, to a first node capacitance and to a second node capacitance.

23. The device according to claim 18 wherein the readout circuit is adapted to generate a feedback current in response to a ratio between a second node capacitance and between a sum of the second node capacitance, a input transistor capacitance and a first node capacitance.

24. The device according to claim 18 further adapted to setting a first node voltage to a high level and then inactivate the input transistor.

25. The device according to claim 18 wherein the control criterion is fulfilled once the pixel is reset.

26. The device according to claim 18 wherein the control criterion is fulfilled once the pixel stores a value representative of a light that was detected by a photo detector of another pixel.

27. The device according to claim 18 wherein the device is adapted to operate the input transistor in a sub-threshold mode and provide to the pixel a feedback signal that is responsive to a result of the measurement of the pixel output signal.

28. The device according to claim 18 further adapted to operate the input transistor in a weak conductive mode.

29. The device according to claim 28 further adapted to operate the input transistor in a strong conductive mode.

30. The device according to claim 18 further adapted to operate the input transistor in a strong conductive mode.

31. The pixel according to claim 18 further adapted to attempt to set a voltage level of the second node to a target value.

32. The pixel according to claim 31 wherein the target value is responsive to a value of a second node voltage level before exposing of the photo-detector to light.

33. The pixel according to claim 31 wherein the target value is responsive ground level alterations between different write cycles.

34. The pixel according to claim 31 wherein the pixel is adapted to perform multiple attempt iterations.

* * * * *